(12) United States Patent
Yamamoto

(10) Patent No.: US 10,948,212 B2
(45) Date of Patent: Mar. 16, 2021

(54) REMOTE CONTROLLER

(71) Applicant: DAIKIN INDUSTRIES, LTD., Osaka (JP)

(72) Inventor: Ryousuke Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 139 days.

(21) Appl. No.: 16/467,571

(22) PCT Filed: Nov. 29, 2017

(86) PCT No.: PCT/JP2017/042890
§ 371 (c)(1),
(2) Date: Jun. 7, 2019

(87) PCT Pub. No.: WO2018/105466
PCT Pub. Date: Jun. 14, 2018

(65) Prior Publication Data
US 2021/0025614 A1    Jan. 28, 2021

(30) Foreign Application Priority Data

Dec. 9, 2016 (JP) .............................. JP2016-239236

(51) Int. Cl.
*G08C 17/02* (2006.01)
*F24F 11/89* (2018.01)
(Continued)

(52) U.S. Cl.
CPC .............. *F24F 11/56* (2018.01); *F24F 13/20* (2013.01); *H04B 1/3833* (2013.01);
(Continued)

(58) Field of Classification Search
None
See application file for complete search history.

(56) References Cited

U.S. PATENT DOCUMENTS

| 6,346,889 B1 * | 2/2002 | Moss | G08B 13/08 |
| | | | 340/545.1 |
| 7,786,892 B2 * | 8/2010 | Marty | G01S 3/02 |
| | | | 340/13.37 |

(Continued)

FOREIGN PATENT DOCUMENTS

| JP | H10-232044 A | 9/1998 |
| JP | 2006-217435 A | 8/2006 |

(Continued)

OTHER PUBLICATIONS

International Preliminary Report on Patentability issued in International Application No. PCT/JP2017/042890, dated Jun. 20, 2019, with English translation of the Written Opinion (8 pages).

(Continued)

*Primary Examiner* — Tuan A Tran
(74) *Attorney, Agent, or Firm* — Osha Bergman Watanabe & Burton LLP

(57) ABSTRACT

A remote controller includes: a casing that comprises a communication surface for near field radio communication on a front panel of the casing; a storage component that is housed in the casing and comprises a shield that shields a magnetic flux; and an antenna for near field radio communication that: is disposed behind the communication surface with a space between the antenna and the communication surface, and comprises a coil pattern with a magnetic flux passing region that passes magnetic flux in a front-rear direction. A part of the coil pattern overlaps with the storage component in the front-rear direction.

20 Claims, 6 Drawing Sheets

(51) Int. Cl.
*H04B 5/00* (2006.01)
*F24F 11/56* (2018.01)
*F24F 13/20* (2006.01)
*H04B 1/3827* (2015.01)

(52) U.S. Cl.
CPC ......... *H04B 5/0031* (2013.01); *H04B 5/0081* (2013.01); *F24F 2013/207* (2013.01)

(56) References Cited

U.S. PATENT DOCUMENTS

| | | | | |
|---|---|---|---|---|
| 8,232,882 | B2* | 7/2012 | Miyabayashi | G06K 7/10207 340/600 |
| 8,280,305 | B2* | 10/2012 | Tamura | G06F 16/639 455/41.1 |
| 9,819,778 | B2* | 11/2017 | Nakano | H01Q 7/00 |
| 9,851,843 | B2* | 12/2017 | Mishra | G06F 3/04184 |
| 10,062,224 | B2* | 8/2018 | Cojocaru | G07C 9/23 |
| 10,235,869 | B2* | 3/2019 | Yamamoto | F24F 11/89 |
| 10,345,958 | B2* | 7/2019 | Mishra | H04B 5/0031 |
| 2010/0007504 | A1 | 1/2010 | Miyabayashi | G06K 7/10128 340/600 |
| 2010/0073202 | A1* | 3/2010 | Mazed | G06F 1/166 340/999 |
| 2012/0068832 | A1* | 3/2012 | Feldstein | G06F 1/1626 340/12.5 |
| 2013/0018513 | A1* | 1/2013 | Metselaar | F24F 11/30 700/278 |
| 2013/0027212 | A1* | 1/2013 | King | G07C 9/0069 340/635 |
| 2013/0196596 | A1* | 8/2013 | Parekh | G06F 3/0447 455/41.1 |
| 2014/0029777 | A1* | 1/2014 | Jang | H04R 25/558 381/315 |
| 2014/0073270 | A1* | 3/2014 | Chou | G06F 3/0416 455/90.2 |
| 2014/0074537 | A1* | 3/2014 | Bargetzi | G06Q 10/02 705/7.19 |
| 2015/0142176 | A1 | 5/2015 | Senba | |
| 2016/0080039 | A1* | 3/2016 | Brahami | H04B 5/0031 455/41.1 |
| 2016/0117874 | A1* | 4/2016 | Daniel-Wayman | G07C 9/00571 340/5.61 |
| 2016/0268674 | A1 | 9/2016 | Orihara | |
| 2016/0359325 | A1* | 12/2016 | Kawata | H02J 3/14 |
| 2016/0365620 | A1* | 12/2016 | Que | H01Q 1/2266 |

FOREIGN PATENT DOCUMENTS

| | | |
|---|---|---|
| JP | 2009-290275 A | 12/2009 |
| JP | 2014-16062 A | 1/2014 |
| JP | 2015-95707 A | 5/2015 |

OTHER PUBLICATIONS

International Search Report issued in corresponding application No. PCT/JP2017/042890 dated Jan. 16, 2018 (3 pages).
Written Opinion of the International Searchin Authority issued in corresponding application No. PCT/JP2017/042890 dated Jan. 16, 2018 (3 pages).
Decision to Grant a Patent issued in corresponding application No. JP2016-239236 dated Jan. 16, 2018 (5 pages).
Extended European Search Report issued in the counterpart European Patent Application No. 17879103.4, dated May 7, 2020 (5 pages).

* cited by examiner

REMOTE CONTROLLER

TECHNICAL FIELD

The present invention relates to a remote controller that can be applied to, for example, an air conditioner and an air cleaner.

BACKGROUND

There is known a multi-type air conditioner that is installed in a building or the like and in which several to several tens of indoor units are connected to one outdoor unit. A remote controller is connected to each of the indoor units in order to set an air-conditioning mode including cooling and heating, a temperature, an air volume and the like (see, for example, Patent Literature 1).

The remote controller is also used for the settings that need to be made at the time of installing the air conditioner. Examples of such settings include those associated with operation control, such as address settings for specifying each indoor unit, and mode settings made in accordance with the structure of a room (ceiling height and floor space) in which the indoor unit has been installed.

Patent Literature 2 listed below discloses a technique for making settings at the time of installing an air conditioner through a remote controller.

PATENT LITERATURE

Patent Literature 1: Japanese Unexamined Patent Publication No. 2014-16062
Patent Literature 2: Japanese Unexamined Patent Publication No. 10-232044

A setting operation on each indoor unit at the time of installing an air conditioner is usually performed through operation of buttons on a remote controller, and is thus extremely complicated. It is desirable to simplify this operation. With the technique described in Patent Literature 2, a personal computer is connected to a remote controller, and information about operation control set in advance using the personal computer is transmitted (input) to the remote controller. This work is also complicated, however, because the personal computer has to be carried into each room to be connected to the corresponding remote controller.

Meanwhile, in recent years, compact portable information terminals such as smartphones and tablet PCs have been widely used. If it is possible to transmit setting information from such a portable information terminal to a remote controller through radio communication, the workload may be further reduced. For example, a smartphone may have a near field radio communication function such as NFC (Near Field Communication) for performing electronic payment or the like. This function extremely facilitates connection between a portable information terminal and a remote controller, making it possible to promptly transmit, to the remote controller, setting information registered in the portable information terminal in advance.

In order to use the near field radio communication function of a portable information terminal, a remote controller needs to incorporate an antenna for near field radio communication. In order to improve communication accuracy, it is desirable to form as large an antenna as possible. The size of a remote controller is limited, however, and a liquid crystal module occupies a large space inside the remote controller. Therefore, there is a limit in forming a large antenna while avoiding the space of the liquid crystal module.

SUMMARY

One or more embodiments of the present invention provide a remote controller that includes as large an antenna as possible in a casing, and thus improves communication accuracy.

(1) A remote controller according to one or more embodiments of the present invention includes:
a casing including a communication surface for near field radio communication on a front panel of the casing;
a storage component stored in the casing and including a shielding part having a property of shielding a magnetic flux; and
an antenna for near field radio communication disposed behind the communication surface with a space between the antenna and the communication surface, the antenna including a coil pattern inside which a magnetic flux passing region for passing a magnetic flux in a front-rear direction is formed,
wherein a part of the coil pattern of the antenna overlaps the storage component in the front-rear direction.

With this configuration, the part of the coil pattern, through which a magnetic flux does not pass, overlaps the storage component. This makes it possible to form as large an antenna as possible and to improve communication accuracy.

(2) The magnetic flux passing region of the antenna may be disposed at a position not overlapping the shielding part of the storage component in the front-rear direction.

With this configuration, a magnetic flux at the antenna is not shielded by the shielding part, and it is possible to reliably prevent a deterioration in communication accuracy.

(3) The storage component may be a liquid crystal module and the shielding part may be an electrode.

The liquid crystal module, which is provided in a wide area in the remote controller, overlaps the part of the coil pattern, making it possible to form as large an antenna as possible.

(4) The liquid crystal module may include a liquid crystal panel and an outer frame including a synthetic resin and surrounding an outer periphery of the liquid crystal panel, and
the part of the coil pattern may overlap the outer frame.

The outer frame including a synthetic resin, which does not shield a magnetic flux of the antenna, overlaps the coil pattern, making it possible to form the antenna as large as possible while securing the passage of a magnetic flux.

(5) The casing may include a first divided body having an outer peripheral wall, and a second divided body connected to the outer peripheral wall, and
the outer peripheral wall disposed closer to the antenna may include a locking part used for connection with the second divided body.

In a case where the locking part is formed through molding in a process of manufacturing the first divided body, a space for removing the mold may be formed on an inner side of the outer peripheral wall, and the antenna may have to be disposed away from the outer peripheral wall by that space. In such a case, the overlap between the part of the coil pattern of the antenna and the storage component is more useful in forming the antenna as large as possible.

(6) The casing may be installed on a wall surface.

In a case where the casing of the remote controller is installed on a wall surface, a surface area of the casing that can be used for near field radio communication is limited. Therefore, an area in the casing where the antenna can be disposed is further limited. Therefore, it is more effective to enlarge the antenna by overlapping the antenna and a storage component as in one or more embodiments of the present invention.

The remote controller according to one or more embodiments of the present invention includes as large an antenna as possible in a casing, and thus improves communication accuracy.

DETAILED DESCRIPTION

Embodiments of the present invention will be described below with reference to the drawings.

Figure 1:
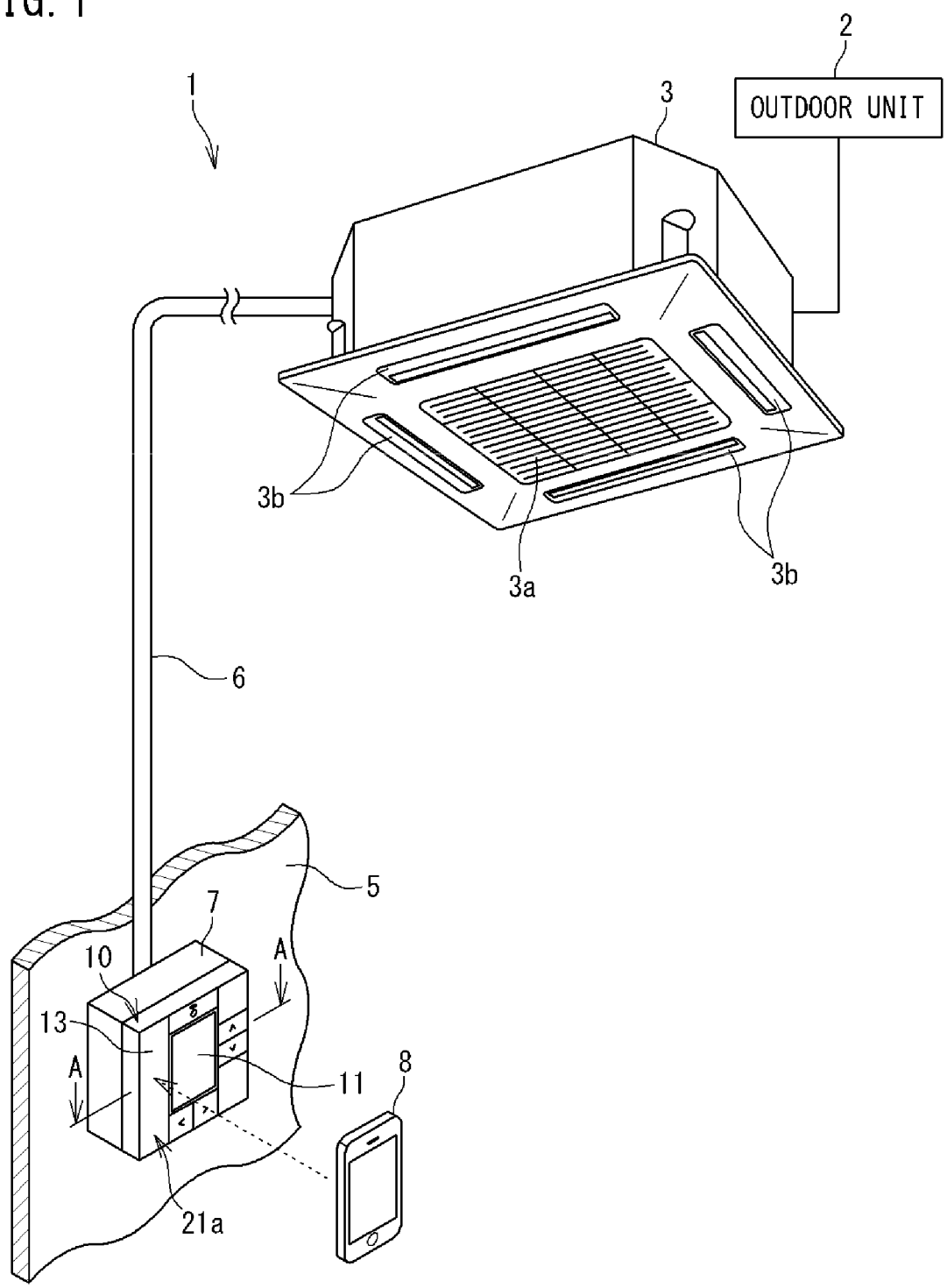
FIG. 1 is a schematic configuration diagram of an air conditioner including a remote controller according to one or more embodiments of the present invention.

FIG. 1 is a schematic configuration diagram of an air conditioner including a remote controller according to one or more embodiments of the present invention.

An air conditioner 1 is, for example, a multi-type air conditioner for building use, which is to be installed in a building or the like. This air conditioner adjusts a temperature, a humidity and the like inside a room through a vapor compression refrigeration cycle operation. The air conditioner 1 includes an outdoor unit 2, an indoor unit 3, and a remote controller 10.

The outdoor unit 2 is installed outdoors and includes a compressor that compresses refrigerant, a heat exchanger that exchanges heat between outdoor air and the refrigerant, a valve that controls the flow of the refrigerant, a fan that takes the outdoor air into the outdoor unit, and a control unit that controls operations of the compressor, the fan, the valve and the like.

The indoor unit 3 is installed on the ceiling of the room, and is connected to the outdoor unit 2 through a refrigerant pipe and an electric wire. The indoor unit 3 includes a heat exchanger that exchanges heat between indoor air and the refrigerant, a valve that controls the flow of the refrigerant, a fan that takes in the indoor air, and a control unit that controls operations of the fan, the valve and the like.

The indoor unit 3 is configured to take in air through an indoor air intake port 3a by operation of the fan and blow out the air after heat exchange through a blow-out port 3b. The electric wire connecting the indoor unit 3 and the outdoor unit 2 includes a communication line for transmitting and receiving a signal between the indoor unit 3 and the outdoor unit 2. Note that the indoor unit 3 is not limited to being installed on the ceiling, but may alternatively be attached to a wall surface or placed on a floor, for example.

The remote controller 10 is attached to a wall surface 5 in the room and is connected to the indoor unit 3 by an electric wire 6. In one or more embodiments, the remote controller 10 is attached via a wiring box 7 attached to the wall surface 5. In the following description, the front surface side of the remote controller 10 will be referred to as the front side, while the rear surface side of the remote controller 10 (the side of the wall surface 5 in the room; the side of the wiring box 7) will be referred to as the rear side.

Figure 2:
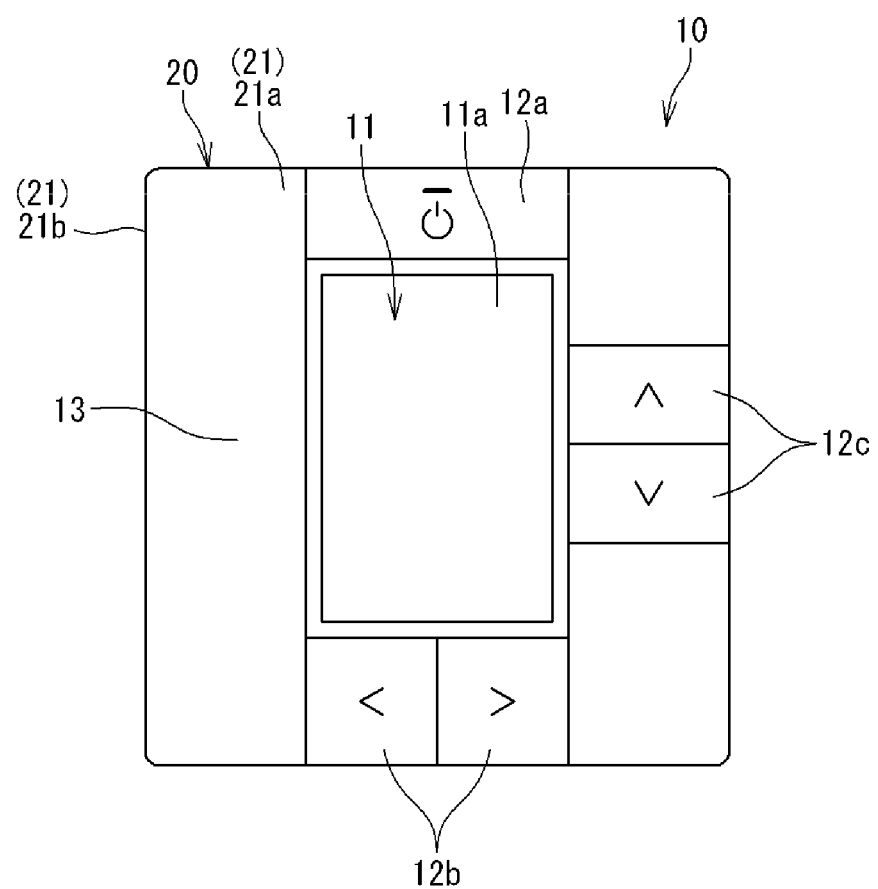
FIG. 2 is a front view of the remote controller according to one or more embodiments of the present invention.

FIG. 2 is a front view of the remote controller according to one or more embodiments. The remote controller 10 includes a display unit 11 and operation switches 12a, 12b, and 12c on a front panel 21a. The display unit 11 is disposed substantially at the center on the front panel 21a of the remote controller 10. The operation switch 12a is provided above the display unit 11. The operation switch 12b is provided below the display unit 11. The operation switch 12c is provided on one of the right and left sides (right side in FIG. 2) of the display unit 11. An operation mode such as cooling and heating, a set temperature, a set air volume, and a set wind direction are displayed on the display unit 11, for example.

The operation switch 12a disposed above the display unit 11 is for turning on and off the air conditioner 1. The operation switches 12b and 12c respectively disposed below and on the right side of the display unit 11 are for switching operation modes and changing a set temperature, for example, and have right and left switches and upper and lower switches for that purpose. A communication surface (touch surface) 13 for performing near field radio communication is provided on the other side of the right and left sides (left side in FIG. 2) of the display unit 11.

As illustrated in FIG. 1, a portable information terminal 8 such as a smartphone is brought into contact with or brought closer to the communication surface 13 in order to perform radio communication between the remote controller 10 and the portable information terminal 8. The radio communication between the remote controller 10 and the portable information terminal 8 makes it possible to transmit, to the remote controller 10, information input to the portable information terminal 8 in advance and to transmit the information from the remote controller 10 to the control units of the indoor unit 3 and the outdoor unit 2. At the time of installing the air conditioner 1, for example, it is necessary to make various settings associated with operation control, such as address settings for a plurality of indoor units 3 and mode settings made in accordance with the structures of rooms (ceiling height and floor space) in which the indoor units 3 have been installed. Such setting information is stored in advance in the portable information terminal 8 and transmitted from the portable information terminal 8 to the remote controller 10 using the near field radio communication, making it possible to perform the setting operation more quickly and easily than a case where the setting information is input via the operation switches 12a, 12b, and 12c of the remote controller 10. Various information, without being limited, can be transmitted from the portable information terminal 8 to the remote controller 10.

Figure 3:
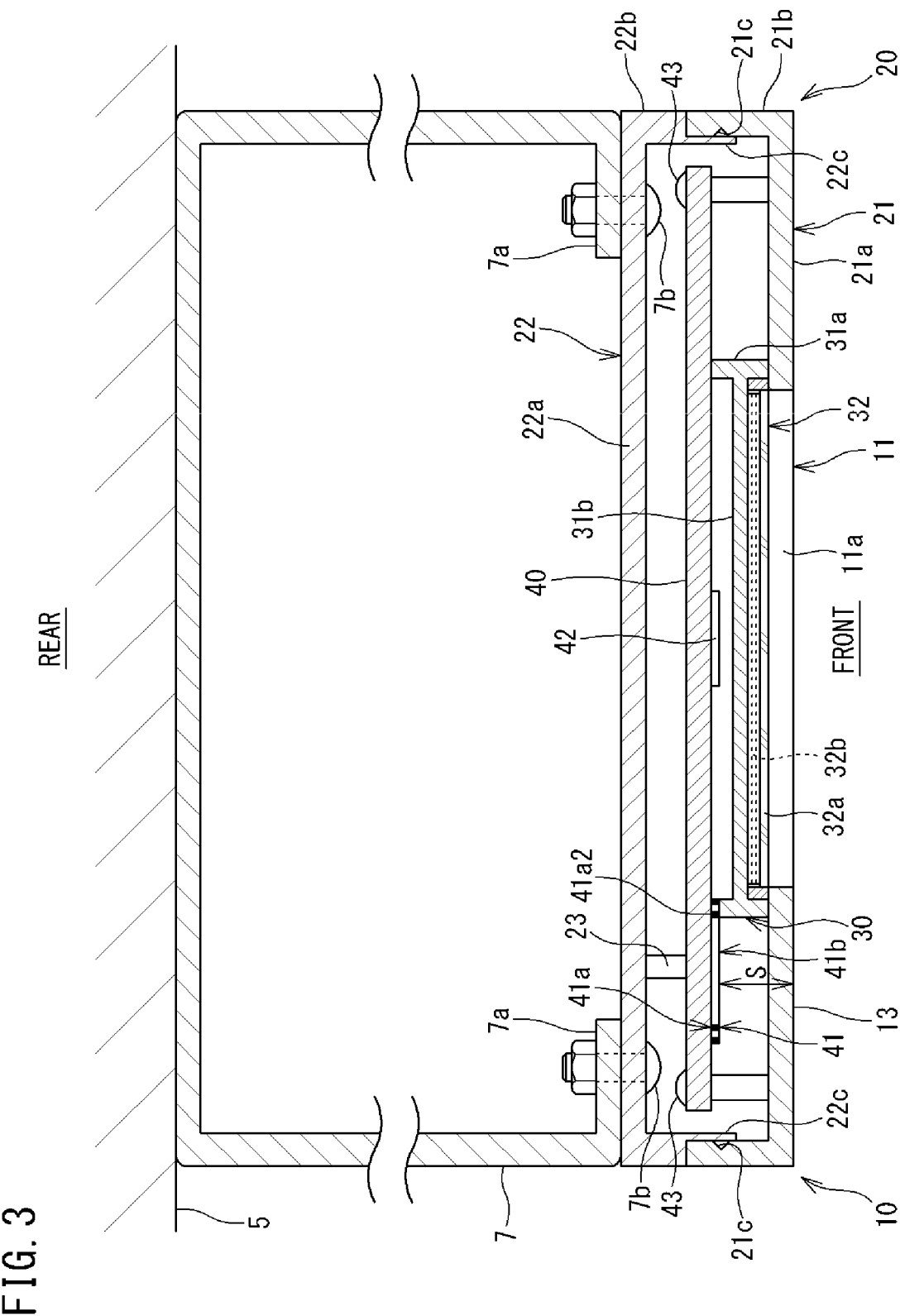
FIG. 3 is a cross-sectional view of the remote controller according to one or more embodiments of the present invention (cross-sectional view taken along line A-A in FIG. 1).

FIG. 3 is a cross-sectional view of the remote controller according to one or more embodiments (cross-sectional view taken along line A-A in FIG. 1). The remote controller 10 includes, for example, a casing 20, and a liquid crystal module 30 and a printed circuit board 40 that are stored inside the casing 20.

The casing 20 is formed into a rectangular parallelepiped shape through molding of a synthetic resin material, and has a storage space inside. The casing 20 includes a first divided body 21 disposed on a front surface side (front side) and a second divided body 22 disposed on a rear surface side (rear side). The first divided body 21 includes a front surface plate 21a formed into a square or rectangular shape as viewed from the front, and an outer peripheral wall 21b provided on an outer periphery of the front surface plate 21a. The front surface plate 21a constitutes a front panel of the remote controller 10. A rectangular transparent window 11a constituting the above-described display unit 11, the operation switches 12a, 12b, and 12c, the communication surface 13, and the like are provided on the front surface plate 21a.

The second divided body 22 includes a rear surface plate 22a formed into a square or rectangular shape as viewed from the front, and an outer peripheral wall 22b provided on an outer periphery of the rear surface plate 22a.

A locking claw 22c protruding forward is provided on the outer peripheral wall 22b of the second divided body 22. A locking recess (locking part) 21c, with which the locking claw 22c is locked, is formed in an inner surface of the outer peripheral wall 21b of the first divided body 21. The first divided body 21 and the second divided body 22 are connected to each other by the outer peripheral walls 21b and 22b of the first and second divided bodies 21 and 22 being brought into contact with each other and by the locking claw 22c being engaged with the locking recess 21c.

Figure 4:
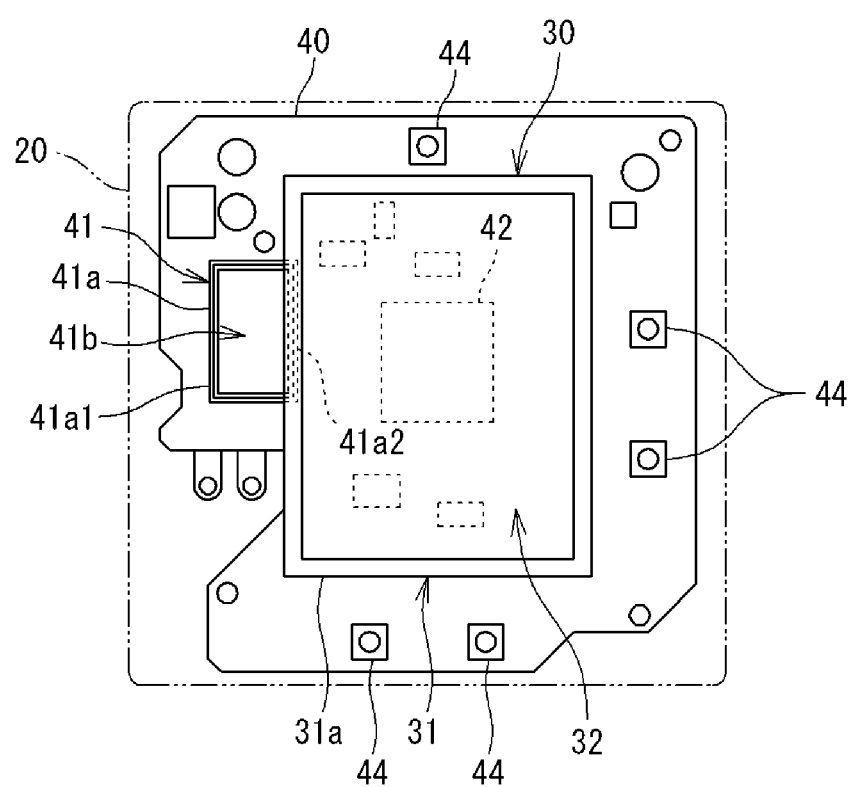
FIG. 4 is a front view of a printed circuit board according to one or more embodiments of the present invention.

FIG. 4 is a front view of the printed circuit board according to one or more embodiments. As illustrated in FIGS. 3 and 4, the liquid crystal module 30 is formed into a substantially rectangular parallelepiped shape and disposed on the rear surface side of the display unit 11 provided on the front panel 21a of the remote controller 10. The liquid crystal module 30 includes a module case 31 and a liquid crystal panel 32 provided in the module case 31. The liquid crystal panel 32 includes a glass plate 32a, a deflecting plate, a transparent electrode 32b, a liquid crystal layer, a backlight, and the like. The module case 31 includes a bottom plate 31b formed into a rectangular shape as viewed from the front, and an outer frame 31a surrounding an outer periphery of the bottom plate 31b. The liquid crystal panel 32 is provided on the front surface side of the bottom plate 31b.

Figure 5:
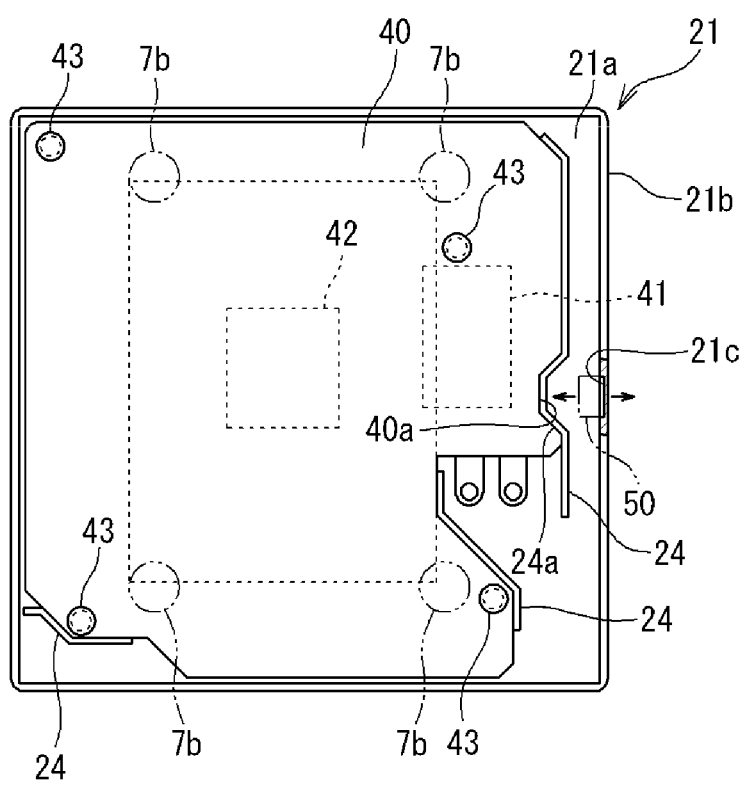
FIG. 5 is a rear view of a first divided body of a casing and the printed circuit board according to one or more embodiments of the present invention.

FIG. 5 is a rear view of the first divided body of the casing and the printed circuit board according to one or more embodiments. As illustrated in FIGS. 3 to 5, the printed circuit board 40 is disposed on the rear surface side of the liquid crystal module 30 and fixed to the front surface plate 21a of the first divided body 21 of the casing 20 by an attachment screw 43 (see FIG. 5). An IC chip such as a microcomputer chip 42 and various electronic elements such as a switch element 44 are mounted on the printed circuit board 40. The printed circuit board 40 is provided with an antenna 41 for near field radio communication.

As illustrated in FIG. 3, the liquid crystal module 30 is fixed to a front surface of the printed circuit board 40. In the module case 31 of the liquid crystal module 30, only the outer frame 31a is in contact with the front surface of the printed circuit board 40, and the bottom plate 31b is disposed at a position away from the printed circuit board 40 in the forward direction. The microcomputer chip 42 and the like are mounted on the printed circuit board 40 behind the bottom plate 31b.

Figure 6:
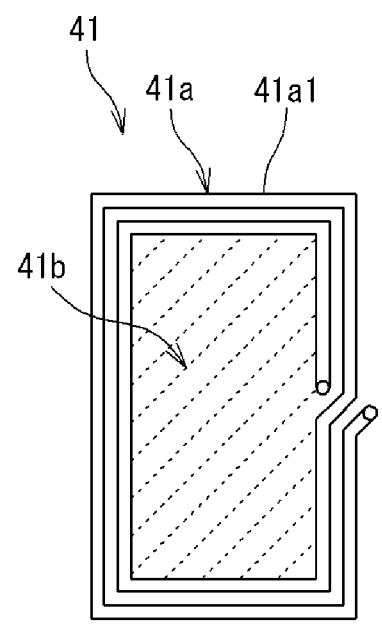
FIG. 6 is a front view of an antenna according to one or more embodiments of the present invention.

The antenna 41 is disposed at a position near the left end of the printed circuit board 40, with a space S behind the communication surface 13 in the casing 20 of the remote controller 10. The space S is set within a range of 5 mm to 15 mm inclusive, for example, 9 mm. As illustrated in FIG. 6, the antenna 41 includes a coil pattern 41a in which printed wiring 41a1 is wound like a coil. The coil pattern 41a of one or more embodiments is formed into such a shape that the printed wiring 41a1 is wound two rounds in a quadrangular shape (rectangular shape). An inner part (hatched by the dotted lines in FIG. 6) of the coil pattern 41a is a region (magnetic flux passing region) 41b through which a magnetic flux passes in the front-rear direction.

As illustrated in FIGS. 3 and 4, the coil pattern 41a of the antenna 41 partially overlaps the liquid crystal module 30 in the front-rear direction. Specifically, a part 41a2 of the printed wiring 41a1 of the coil pattern 41a overlaps a rear surface of the outer frame 31a of the module case 31 in the liquid crystal module 30. The magnetic flux passing region 41b formed inside the coil pattern 41a is disposed at a position not overlapping the liquid crystal module 30 in the front-rear direction.

As illustrated in FIG. 4, the liquid crystal module 30 is provided in the majority of a surface area of the printed circuit board 40. Therefore, in order for the antenna 41 not to overlap the liquid crystal module 30, the antenna 41 needs to be formed small. In one or more embodiments, the antenna 41 is disposed while partially overlapping the liquid crystal module 30. It is thus possible to form the antenna 41 as large as possible and to improve communication accuracy (communication quality). Furthermore, only the part 41a2 of the printed wiring 41a1 in the antenna 41 overlaps the liquid crystal module 30, and the magnetic flux passing region 41b does not overlap the liquid crystal module 30. Therefore, the liquid crystal module 30 does not block the passage of a magnetic flux, making it possible to improve the communication accuracy suitably.

The liquid crystal module 30 includes a member having a property of shielding a magnetic flux (shielding part or shield), for example, the transparent electrode 32b. Meanwhile, in order to ensure the communication accuracy, the antenna 41 just needs to be disposed at a position where at least the magnetic flux passing region 41b does not overlap the shielding part 32b of the liquid crystal module 30. As long as this condition is satisfied, the coil pattern 41a just needs to be disposed while overlapping the shielding part 32b that is located further inside than the outer frame 31a in the liquid crystal module 30, and the magnetic flux passing region 41b may be disposed while overlapping the outer frame 31a of the module case 31 that does not block the passage of a magnetic flux.

For example, if the antenna 41 is provided immediately behind the communication surface 13 of the casing 20 without a space, or with a slight gap therebetween, the distance between the antenna 41 and the communication surface 13 becomes short, making it possible to ensure the accuracy of communication with the portable information terminal 8 even with the antenna 41 that is not so large. In this case, however, it is necessary to form the antenna 41 on a board different from the printed circuit board 40, and thus the number of components in the remote controller 10 increases and the structure thereof becomes complicated. In one or more embodiments, on the other hand, the antenna 41 is formed, with the space S from the communication surface 13, on the printed circuit board 40 on which the microcomputer chip 42 and the like are mounted, and the antenna 41 partially overlaps the liquid crystal module 30 in the front-rear direction so as to make the antenna 41 as large as possible. This makes it possible to improve the communication accuracy while reducing the number of components in the remote controller 10 and preventing the complication of the structure thereof.

As illustrated in FIG. 3, a support protrusion 23 protruding forward is provided on the rear surface plate 22*a* of the second divided body 22 in the casing 20. The support protrusion 23 supports, from the rear side, a part of the printed circuit board 40 where the antenna 41 is formed. With such a configuration, even if the front panel 21*a* of the casing 20 is bent rearward by the portable information terminal 8 being pressed against the communication surface 13 of the casing 20, the antenna 41 of the printed circuit board 40 fixed to the front panel 21*a* is supported by the support protrusion 23 so as not to bend. Therefore, the space S between the communication surface 13 and the antenna 41 does not widen, and the communication accuracy can suitably be maintained.

As illustrated in FIG. 5, a guide wall 24 is formed on the rear surface side of the front surface plate 21*a* of the first divided body 21 in the casing 20. The guide wall 24 is formed in a shape along the outer periphery of the printed circuit board 40 and defines the attachment position with the printed circuit board 40. The locking recess 21*c*, with which the locking claw 22*c* of the second divided body 22 is locked, is formed in the outer peripheral wall 21*b* closer to the antenna 41 of the printed circuit board 40. It is necessary to use a slide mold 50 for molding the casing 20, since the locking recess 21*c* of the first divided body 21 is dug into the outer peripheral wall 21*b*. In order to secure a moving space of the slide mold 50, it is necessary to form a part 24*a* of the guide wall 24 in a recessed shape, and accordingly, it is necessary to form a recess 40*a* also in the printed circuit board 40. Therefore, it is also necessary to dispose the antenna 41 closer to the center of the printed circuit board 40 by a distance corresponding to the recess 40*a*. However, the antenna 41 partially overlaps the liquid crystal module 30 in the front-rear direction, and thus it is not necessary to reduce the size of the antenna 41.

Since the remote controller 10 of one or more embodiments is attached to the wall surface 5 of the room via the wiring box 7, the rear surface side of the remote controller 10 is completely covered. In addition, a thickness of the remote controller 10 in the front-rear direction is smaller than a horizontal width and a vertical width thereof. Therefore, only the front surface of the remote controller 10 can be used for near field radio communication, and an area where the antenna 41 can be disposed is also limited. Therefore, it is more effective to form the large antenna 41 while making the antenna 41 partially overlap the liquid crystal module 30 in the front-rear direction.

The remote controller 10 of one or more embodiments is attached to the wiring box 7 attached to the wall surface 5 of the room. Specifically, as illustrated in FIG. 3, the rear surface plate 22*a* of the second divided body 22 in the casing 20 is attached, with an attachment screw 7*b*, to an attachment piece 7*a* provided on the front surface side of the wiring box 7. Since the attachment screw 7*b* is made of metal and has a property of shielding a magnetic flux at the antenna 41, the antenna 41 is disposed at a position not overlapping the attachment screw 7*b* as illustrated in FIG. 5. Therefore, the attachment screw 7*b* does not deteriorate the communication accuracy.

The present invention is not limited to the above embodiments, but can be appropriately modified within the scope of the invention described For example, in the above embodiments, the remote controller 10 is attached to the wiring box 7 attached to the wall surface 5 of the room. Alternatively, the remote controller 10 may be directly attached to the wall surface 5.

In the above embodiments, an example has been described in which the antenna 41 overlaps the liquid crystal module 30 in the front-rear direction. Alternatively, the antenna 41 may overlap a storage component that is stored in the casing 20 and different from the liquid crystal module 30, in which case the storage component includes a part having a property of shielding a magnetic flux.

In the above embodiments, the remote controller 10 of the air conditioner has been described. However, the present invention is also applicable to a remote controller 10 of other apparatuses, for example, a remote controller 10 of an air cleaner or a hot water supply apparatus.

Although the disclosure has been described with respect to only a limited number of embodiments, those skill in the art, having benefit of this disclosure, will appreciate that various other embodiments may be devised without departing from the scope of the present invention. Accordingly, the scope of the invention should be limited only by the attached claims.

REFERENCE SIGNS LIST

5: WALL SURFACE
8: PORTABLE INFORMATION TERMINAL
10: REMOTE CONTROLLER
13: COMMUNICATION SURFACE
20: CASING
21: FIRST DIVIDED BODY
21*a*: FRONT SURFACE PLATE (FRONT PANEL)
21*b*: OUTER PERIPHERAL WALL
21*c*: LOCKING RECESS (LOCKING PART)
22: SECOND DIVIDED BODY
30: LIQUID CRYSTAL MODULE (STORAGE COMPONENT)
31: MODULE CASE
31*a*: OUTER FRAME
32: LIQUID CRYSTAL PANEL
32*b*: TRANSPARENT ELECTRODE (SHIELDING PART)
41: ANTENNA
41*a*: COIL PATTERN
41*a*2: PART
41*b*: MAGNETIC FLUX PASSING REGION
S: SPACE

The invention claimed is:

1. A remote controller comprising:
   a casing that comprises a communication surface for near field radio communication on a front panel of the casing;
   a storage component that is housed in the casing and comprises a shield that shields a magnetic flux; and
   an antenna for near field radio communication that:
      is disposed behind the communication surface with a space between the antenna and the communication surface, and
      comprises a coil pattern with a magnetic flux passing region that passes magnetic flux in a front-rear direction,
   wherein a part of the coil pattern overlaps with the storage component in the front-rear direction.

2. The remote controller according to claim 1, wherein the magnetic flux passing region does not overlap with the shield in the front-rear direction.

3. The remote controller according to claim 2, wherein the storage component is a liquid crystal module, and the shield is an electrode.

4. The remote controller according to claim 3, wherein the liquid crystal module comprises:
  a liquid crystal panel; and
  an outer frame that comprises a synthetic resin and surrounds an outer periphery of the liquid crystal panel, and
the part of the coil pattern overlaps with the outer frame.

5. The remote controller according to claim 4, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

6. The remote controller according to claim 4, wherein the casing is installed on a surface of a wall.

7. The remote controller according to claim 3, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

8. The remote controller according to claim 7, wherein the casing is installed on a surface of a wall.

9. The remote controller according to claim 3, wherein the casing is installed on a surface of a wall.

10. The remote controller according to claim 2, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

11. The remote controller according to claim 2, wherein the casing is installed on a surface of a wall.

12. The remote controller according to claim 1, wherein the storage component is a liquid crystal module, and the shield is an electrode.

13. The remote controller according to claim 12, wherein the liquid crystal module comprises:
  a liquid crystal panel; and
  an outer frame that comprises a synthetic resin and surrounds an outer periphery of the liquid crystal panel, and
the part of the coil pattern overlaps with the outer frame.

14. The remote controller according to claim 13, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

15. The remote controller according to claim 13, wherein the casing is installed on a surface of a wall.

16. The remote controller according to claim 12, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

17. The remote controller according to claim 12, wherein the casing is installed on a surface of a wall.

18. The remote controller according to claim 1, wherein the casing comprises:
  a first divided body comprising an outer peripheral wall; and
  a second divided body connected to the outer peripheral wall, and
  a part of the outer peripheral wall that is disposed closer to the antenna comprises a locking part that connects the first divided body with the second divided body.

19. The remote controller according to claim 18, wherein the casing is installed on a surface of a wall.

20. The remote controller according to claim 1, wherein the casing is installed on a surface of a wall.

* * * * *